US010118977B2

(12) United States Patent
Sumerin et al.

(10) Patent No.: US 10,118,977 B2
(45) Date of Patent: Nov. 6, 2018

(54) ZIEGLER-NATTA CATALYST AND PREPARATION THEREOF (71) Applicant: Borealis AG, Vienna (AT)

(72) Inventors: Victor Sumerin, Helsinki (FI); Joseph Thorman, Helsinki (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/536,919

(22) PCT Filed: Dec. 17, 2015

(86) PCT No.: PCT/EP2015/080316
§ 371 (c)(1),
(2) Date: Jun. 16, 2017

(87) PCT Pub. No.: WO2016/097193
PCT Pub. Date: Jun. 23, 2016

(65) Prior Publication Data
US 2017/0349683 A1    Dec. 7, 2017

(30) Foreign Application Priority Data
Dec. 18, 2014    (EP) .................................... 14198874

(51) Int. Cl.
C08F 210/16    (2006.01)
(52) U.S. Cl.
CPC .................................. C08F 210/16 (2013.01)
(58) Field of Classification Search
None
See application file for complete search history.

(56) References Cited

U.S. PATENT DOCUMENTS

| 4,071,674 | A | 1/1978 | Kashiwa et al. |
| 5,055,535 | A | 10/1991 | Spitz et al. |
| 5,215,949 | A | 6/1993 | Koskinen et al. |
| 5,326,835 | A | 7/1994 | Ahvenainen et al. |
| 5,468,698 | A | 11/1995 | Koskinen et al. |
| 5,684,097 | A | 11/1997 | Palmroos |
| 5,767,034 | A | 6/1998 | Diaz-Barrios et al. |
| 5,905,050 | A | 5/1999 | Koshinen et al. |
| 6,034,026 | A | 3/2000 | Garoff et al. |
| 6,818,584 | B2 | 11/2004 | Garoff et al. |
| 6,924,343 | B2 | 8/2005 | Lindroos et al. |
| 7,427,653 | B2 | 9/2008 | Brita et al. |
| 7,645,843 | B2 | 1/2010 | Elovainio et al. |
| 8,143,184 | B2 | 3/2012 | Garoff et al. |

(Continued)

FOREIGN PATENT DOCUMENTS

| EP | 0376936 | 7/1990 | |
| EP | 0428054 | 5/1991 | |
| EP | 2746306 A1 * | 6/2014 | ............ C08F 210/16 |

*Primary Examiner* — Catherine S Branch
(74) *Attorney, Agent, or Firm* — Diederiks & Whitelaw, PLC (57) ABSTRACT This invention relates to a solid $MgCl_2$ based Natta catalyst component for producing olefin polymers and preparation of said catalyst component. Further the invention relates to a Ziegler Natta catalyst comprising said solid catalyst component, Group 13 metal compound as cocatalyst and optionally external additives. The invention further relates to the use of said catalyst component in producing olefin polymers, especially ethylene polymers with desired properties.

20 Claims, 6 Drawing Sheets (56) References Cited

U.S. PATENT DOCUMENTS

| | | |
|---|---|---|
| 8,575,283 B1 | 11/2013 | Fang et al. |
| 9,556,295 B2 | 1/2017 | Saeed et al. |
| 2010/0130705 A1 | 5/2010 | Lindroos et al. |
| 2015/0315316 A1 | 11/2015 | Jayaratne et al. |
| 2017/0066852 A1 | 3/2017 | Kipiani et al. |

* cited by examiner

ZIEGLER-NATTA CATALYST AND PREPARATION THEREOF

CROSS-REFERENCE TO RELATED APPLICATIONS

This application represents the U.S. National Phase of International Application number PCT/EP2015/080316 entitled "Ziegler-Natta Catalyst and Preparation Thereof" filed 17 Dec. 2015, which claims priority from and the benefit of European patent application No. 14198874.1 filed on 18 Dec. 2014. The entire contents of these applications are incorporated herein by reference.

This invention relates to a solid Ziegler-Natta catalyst component for producing olefin polymers and preparation of said catalyst component. Further the invention relates to a Ziegler Natta catalyst comprising said solid catalyst component, Group 13 metal compound as cocatalyst and optionally external additives. The invention further relates to the use of said catalyst component in producing olefin polymers, especially ethylene polymers with desired properties.

BACKGROUND OF THE INVENTION

Ziegler-Natta (ZN) type polyolefin catalysts are well known in the field of producing olefin polymers, like ethylene (co)polymers. Generally the catalysts comprise at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC), and, optionally, an internal organic compound, like an internal electron donor. A ZN catalyst may also comprise further catalyst component(s), such as a cocatalyst and optionally external additives.

A great variety of Ziegler-Natta catalysts have been developed to fulfill the different demands in reaction characteristics and producing poly(alpha-olefin) resins of desired physical and mechanical performance. Typical Ziegler-Natta catalysts contain a magnesium compound, an aluminium compound and a titanium compound supported on a particulate support. The commonly used particulate supports are inorganic oxide type of supports, such as silica, alumina, titania, silica-alumina and silica-titania, typically silica.

The catalyst can be prepared by sequentially contacting the carrier with the above mentioned compounds, for example, as described in EP 688794 and WO 99/51646. Alternatively, it can be prepared by first preparing a solution from the components and then contacting the solution with a carrier, as described in WO 01/55230.

Another group of typical Ziegler-Natta catalysts are based on magnesium dihalide, typically $MgCl_2$, that contain a titanium compound and optionally a Group 13 compound, for example, an aluminium compound. Such catalysts are disclosed, for instance, in EP376936, WO 2005/118655 and EP 810235. The above described ZN-catalysts are claimed to be useful in olefin polymerisation, for example the production of ethylene (co)polymers.

However, even though many catalysts of prior art show satisfactory properties for many applications there has been the need to modify and improve the properties and performance of the catalysts to achieve desired polymer properties and to have catalysts with desired performance in desired polymerisation processes.

Hydrogen and comonomer responses and thus catalyst flexibility as regards to possibilities to control the molecular weight (Mw), polymer molecular weight distribution (MWD) and comonomer content are general indicators of the catalyst performance. Thus, problems relating to these properties indicate performance properties of the catalysts. Further, it's known that if high molecular weight polymer is desired, and the hydrogen amount cannot be reduced anymore, then external additives can be used in the polymerisation. However, in that case polymers are often produced at the expense of the catalyst productivity. There have been several attempts to find solutions by modifying the catalyst. One way to modify the catalyst is to use internal organic compounds. However, even if e.g. the molecular weight of the polymer is improved, often it happens at the cost of some other properties, usually catalyst productivity and comonomer response. Internal organic compounds can be internal electron donors or other compounds affecting the performance of the catalyst, and external additives comprise e.g. external electron donors and/or alkyl halides.

U.S. Pat. No. 5,055,535 discloses a method for controlling the molecular weight distribution (MWD) of polyethylene homopolymers and copolymers using a ZN catalyst comprising an electron donor selected from monoethers (e.g. tetrahydrofuran). The monoether is added to the catalytic component in the presence of the cocatalyst and is further characterised that under no circumstance should the monoethers be brought into contact with the catalytic component without the presence of the cocatalyst in the medium.

WO 2007051607 A1 suggests the possibility of tailoring the properties of a multimodal ethylene polymer by using alkyl ether type internal electron donor, preferably tetrahydrofuran, to modify ZN catalyst component to influence the molecular weight distribution (MWD) of a higher molecular weight (HMW) component.

WO2004055065 discloses solid catalyst component comprising Ti, Mg, halogen and electron donor in specific molar ratios for preparation copolymers of ethylene with α-olefins, where said α-olefins are homogeneously distributed along the polymer chains. The electron donor (ED) is preferably ether, like tetrahydrofuran. Said catalyst component is used in polymerisation together with alkylaluminium compound and optionally with external electron donor. The optional external electron donor is said to be equal to or different from the ED used in catalyst component.

EP0376936 discloses a $MgCl_2$ supported ZN catalyst, where spray-dried $MgCl_2$/alcohol carrier material is treated with a compound of group IA to IIIA (Groups 1, 2 and 13 of the Periodic Table (IUPAC, Nomenclature of Inorganic Chemistry, 1989)) then titanated with a titanium compound, optionally in the presence of internal electron donor. The optional internal donor compound (THF or di-isobutyl phthalate are given in those examples where internal electron was used) is added together with $TiCl_4$ or after adding $TiCl_4$.

However, the activity of the donor modified catalysts of EP0376936 was much lower than the original catalyst without the donor. Moreover, during the donor treatment step, a 10 wt % solution of triethylaluminum and a number of hydrocarbon washings were used, which resulted in a large amount of organic solvent waste.

WO 2014004396 A1 discloses a catalyst component, where bi-heterocyclic compounds are used as internal or external donor. The catalyst is used for propylene polymerisation.

EP 2746306 discloses a supported Ziegler-Natta catalyst component comprising an internal electron donor selected from bi-cyclic ethers. The catalyst of EP 2746306 is prepared by depositing a soluble alkoxy compound of Group 1 to 3 metal, a compound of Group 13 metal, an internal electron donor and a transition metal compound of Group 4 to 6 on a particulate support, or alternatively forming precipitated support material by contacting a soluble magnesium alkoxide compound, an electron donor solution and a solution of aluminium alkyl chloride compound. After precipitation and suitable washing steps the obtained solid support material was treated with a titanium compound to obtain the catalyst component. In this case the molecular weight of the polymer is improved at the cost of catalyst productivity. Moreover, catalyst performance and morphology of precipitated $MgCl_2$ based catalysts are typically sensitive to even small variations in preparation conditions, especially in large scale production.

Although much development work in Ziegler-Natta catalyst preparation has been done, there is still room for improvement. As stated above, some of the methods are particularly sensitive to preparation conditions and/or large amounts of waste material are formed, which are disadvantages in preparing catalyst at a large scale. Modifications of the catalyst synthetic procedure may adversely affect the productivity of the subsequent catalyst so as to not be satisfactory for commercial scale production. Additionally, catalyst morphology can be difficult to control, especially in large scale production. In addition to the needs of catalyst properties and performance, catalyst preparation at commercial-scale should be as simple and robust as possible. Further, the chemicals used in the preparation should be viewed as safe from a health, safety and environment point of view.

Therefore, it would be desired to find a more robust method to prepare the catalyst that allows production at a large scale of a catalyst which is less sensitive to morphology changes with changes in catalyst preparation conditions and chemicals. Further, it is desired that large amounts of waste material during the synthesis can be avoided.

Further, from commercial point of view, the catalyst should show a reproducible composition and performance.

There is also a need to find a catalyst which is able to produce copolymers with wider melt flow rate (MFR) and density windows, such that there is the possibility to produce high molecular weight copolymers with narrow MWD (molecular weight distribution) and high comonomer content combined with low melting temperature.

And finally, the catalyst should have productivity on a level, which makes it useful in commercial polymerisation processes while producing a broad range of molecular weight polymers.

Based on the teachings of prior art, it appears that donor modification might result in the improvement of some properties. However, very often these improvements are made at the cost of catalyst productivity and comonomer response. The $MgCl_2$ based catalysts prepared by precipitation methods are typically sensitive towards changes in preparation conditions.

SUMMARY OF THE INVENTION

It has now been surprisingly found that the problems of the prior art can be solved, when a solid $MgCl_2$ based catalyst component modified with a specific internal organic compound and prepared by a defined method as described below is used.

Thus, the object of the present invention is to provide a new method for preparing a solid $MgCl_2$ based catalyst component. The present invention relates also to a solid $MgCl_2$ based catalyst component and a solid $MgCl_2$ based catalyst component prepared by the inventive method. Further, the invention relates to a catalyst comprising said solid $MgCl_2$ based catalyst component, a cocatalyst and optionally an external additive. An additional object of the present invention is the use of the solid $MgCl_2$ based catalyst component prepared by the method of the invention in olefin polymerisation process.

In the present disclosure, the term internal organic compound covers, but is not restricted to, internal electron donors, which phrase is widely used in patent literature. Said internal organic compound denotes a compound being part of the solid catalyst component, i.e. added during the synthesis of the solid catalyst component. External additives cover any additive, covering but not restricted to, external electron donors, and mean a component being not part of the solid catalyst component, but fed as separate component to the polymerisation process.

The phrases carrier and support have the same meaning in the present disclosure.

DETAILED DESCRIPTION OF THE INVENTION

Accordingly, the present invention relates to a method for producing solid $MgCl_2$ supported catalyst component comprising the steps a) providing solid carrier particles of $MgCl_2$*mROH adduct b) pre-treating the solid carrier particles of step a) with a compound of Group 13 metal c) treating the pre-treated solid carried particles of step b) with a transition metal compound of Group 4 to 6 d) recovering the solid catalyst component wherein the solid carrier particles are contacted with an internal organic compound of formula (I) or isomers or mixtures therefrom before treating the solid carrier particles in step c)

and
wherein in the formula (I)
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring,
the two oxygen-containing rings are individually saturated or partially unsaturated or unsaturated, and
R in the adduct $MgCl_2$*mROH is a linear or branched alkyl group with 1 to 12 C atoms, and m is 0 to 6.

Accordingly, the internal organic compound of formula (I) is contacted with the solid carrier particles before treatment of solid carrier particles with the transition metal compound of Group 4 to 6. Thus, said internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

The present invention relates also to the solid catalyst component prepared by the method as described above. Further, the present invention provides a Ziegler-Natta catalyst comprising solid catalyst component prepared as defined above, a cocatalyst and optionally an external additive.

Further, one object of the invention is to use the catalyst in accordance with the present invention in the process for producing ethylene polymers. The catalyst of the present invention or produced by the inventive method is especially suitable for producing ethylene copolymers in a multistage process.

The invention will be described in the following in greater detail, referring to the particular preferred embodiments. Preferred embodiments are described in dependent claims as well as in the following description.

As used herein, the term Ziegler Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier used in this invention is a carrier where alcohol is coordinated with Mg dihalide, preferably $MgCl_2$. The $MgCl_2$ is mixed with an alcohol (ROH) and the solid carrier $MgCl_2$*mROH is formed according to the well know methods. As examples, spray drying or spray crystallisation methods can be used to prepare the magnesium halide. Spherical and granular $MgCl_2$*mROH carrier materials are suitable to be used in the present invention. The alcohol in producing $MgCl_2$*mROH carrier material is an alcohol ROH, where R is a linear or branched alkyl group containing 1 to 12 carbon atoms, preferably 1 to 8 carbon atoms, like 1 to 4 carbon atoms. Ethanol is typically used. In $MgCl_2$*mROH, m is 0 to 6, more preferably 1 to 4, especially 2.7 to 3.3.

$MgCl_2$*mROH is available from commercial sources or can be prepared by methods described in prior art. Preparation methods of $MgCl_2$*mROH carrier is described in several patents e.g. in EP-A-0376936, EP-A-0424049, EP-A-655073, U.S. Pat. No. 4,071,674 and EP-A-0614467, which are incorporated here by reference. The solid carrier particles of the invention may consist of $MgCl_2$*mROH.

Group 13 metal compound, used in step b) is preferably an aluminium compound. Particularly preferably the aluminium compound is an aluminium compound of the formula $Al(alkyl)_xX_{3-x}$ (II), wherein each alkyl is independently an alkyl group of 1 to 12 carbon atoms, preferably 1 to 8 carbon atoms, more preferably 1 to 6 carbon atoms, X is halogen, preferably chlorine and $1<x\le3$. The alkyl group can be linear, branched or cyclic, or a mixture of such groups.

Preferred aluminium compounds are dialkyl aluminium chlorides or trialkyl aluminium compounds, for example dimethyl aluminium chloride, diethyl aluminium chloride, di-isobutyl aluminium chloride, and triethylaluminium or mixtures therefrom. Most preferably the aluminium compound is a trialkyl aluminium compound, especially triethylaluminium compound.

The transition metal compound of Group 4 to 6 is preferably a Group 4 transition metal compound or a vanadium compound and is more preferably a titanium compound. Particularly preferably the titanium compound is a halogen-containing titanium compound of the formula $X_yTi(OR^8)_{4-y}$, wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used.

The internal organic compound is selected from bi-cyclic ether compounds of formula (I) or isomers or mixtures therefrom:

(I)

wherein in the formula (I)
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, and whereby the two oxygen-containing rings are individually saturated or partially unsaturated or unsaturated, and R in the adduct $MgCl_2$*mROH is a linear or branched alkyl group with 1 to 12 carbon atoms, and m is 0 to 6.

Examples of preferred linear or branched $C_1$ to $C_8$-alkyl groups are methyl, ethyl, n-propyl, i-propyl, n-butyl, sec-butyl, tert-butyl, pentyl and hexyl groups.

Examples for preferred $C_3$-$C_8$-alkylene groups are pentylene and butylene groups.

The two $R_1$ are preferably the same and are a linear $C_1$ to $C_4$-alkyl groups, more preferably methyl or ethyl; or the two $R_1$ form a ring with the carbon atom they are attached to a ring with 3 to 7 carbon atoms, preferably cyclopentyl or cyclohexyl ring.

Most preferably both $R_1$ are methyl.

$R_2$ to $R_5$ are the same or different and are preferably H or a $C_1$ to $C_2$-alkyl groups, or two or more of $R_2$ to $R_5$ residues can form a ring. If one or more rings are formed by the residues $R_2$ to $R_5$, these are more preferably formed by $R_3$ and $R_4$ and/or $R_4$ and $R_5$.

Preferably the residues $R_2$ to $R_5$ do not form rings and more preferably at most two of the residues $R_2$ to $R_5$ are a methyl, the others are H. Most preferably $R_2$ to $R_5$ are all H.

Furthermore both oxygen-containing rings are preferably saturated or partially unsaturated or unsaturated.

Each partially unsaturated or unsaturated oxygen-containing ring can have one or two double bonds.

More preferably both oxygen-containing rings are saturated.

Examples of preferred internal organic compounds are 2,2-di(2-tetrahydrofuryl)propane, 2,2-di-(2-furan)-propane, and isomers or mixtures thereof.

In the most preferred embodiment, 2,2-di(2-tetrahydrofuryl)propane (DTHFP) is used with the isomers thereof. DTHFP is typically a 1:1 mol/mol diastereomeric mixture of D,L-(rac)-DTHFP and meso-DTHFP.

According to the present invention, it has been found that using an internal organic compound that is enriched in isomers of DTHFP, that the catalyst morphological properties are not influenced. It was found that by using enriched rac-DTHFP, where the ratio of D,L-(rac)-DTHFP/meso- DTHFP is at least 2/1 mol/mol, it was possible to produce the catalyst morphology as good as with the equimolar (rac) and (meso) mixture.

Figure 1:
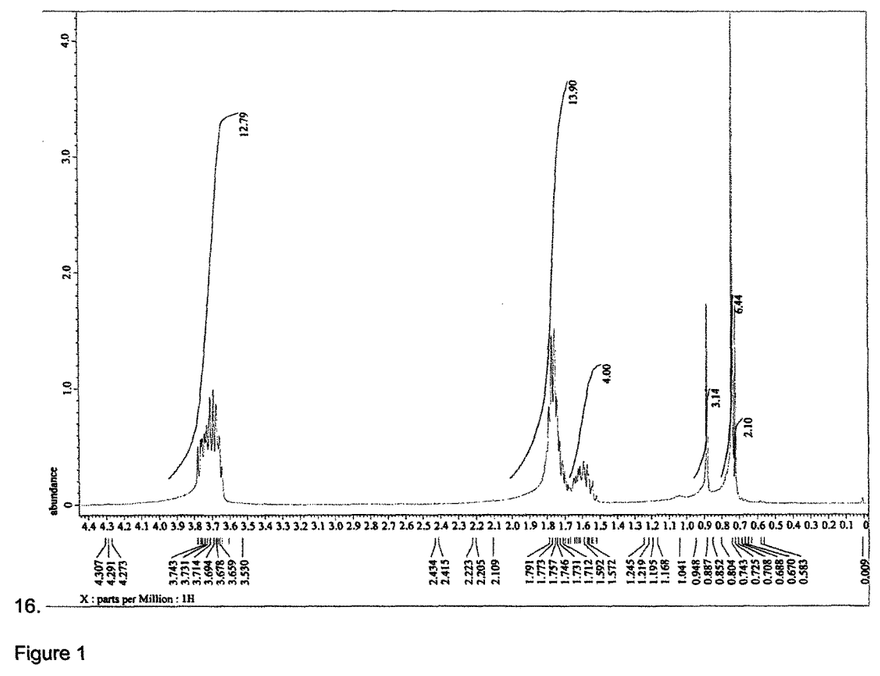
FIG. 1: $^1$H-NMR of DTHFP: a 1:1 mixture of D,L-(rac)-DTHFP and meso-DTHFP diastereomers.

$^1$H-NMR of DTHFP: a 1:1 mol/mol mixture of rac and meso diastereomers is disclosed in FIG. 1.

Figure 2:
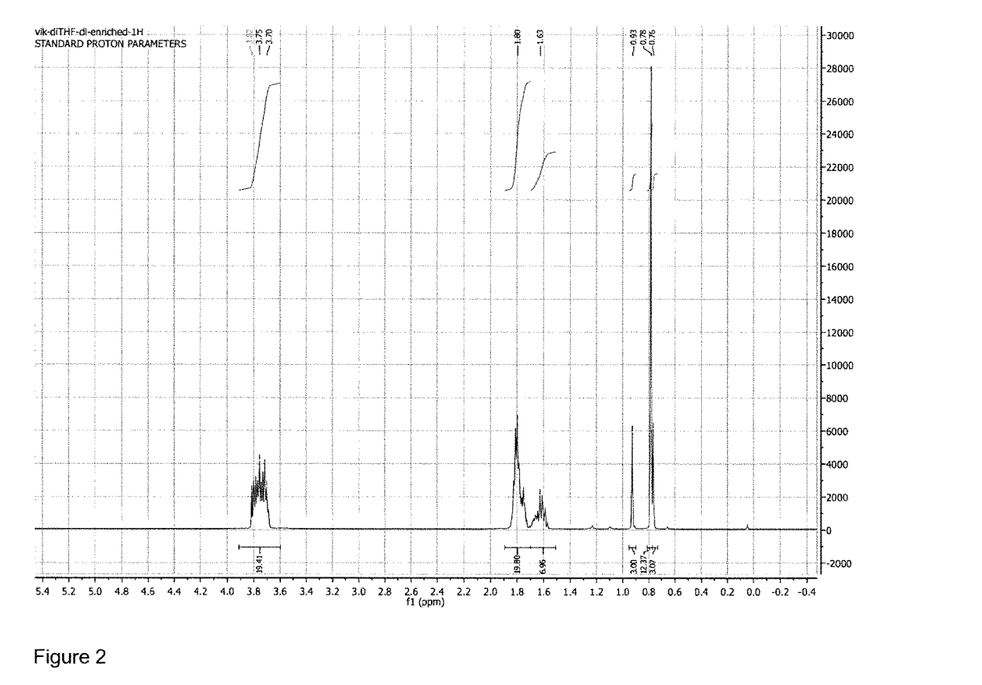
FIG. 2: $^1$H-NMR of DTHFP: a 2:1 mol/mol mixture of D,L-(rac)-DTHFP and meso-DTHFP
Figure 3:
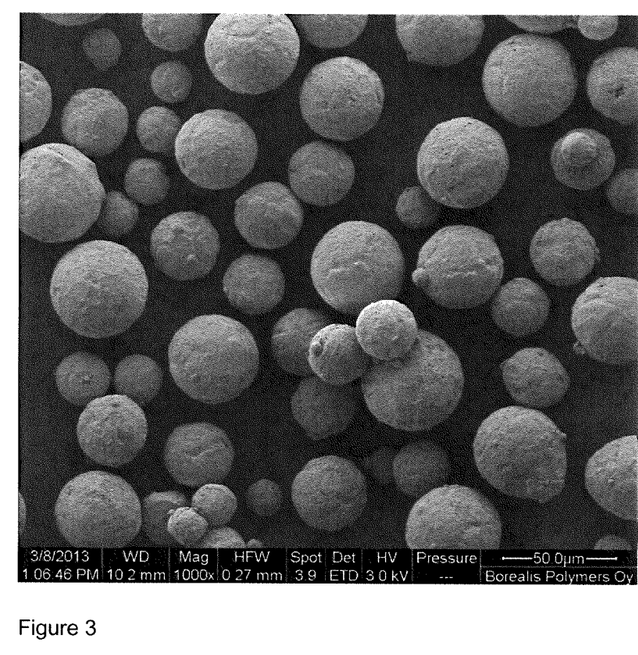
FIG. 3: SEM Figure of catalyst of comparative example 1
Figure 4:
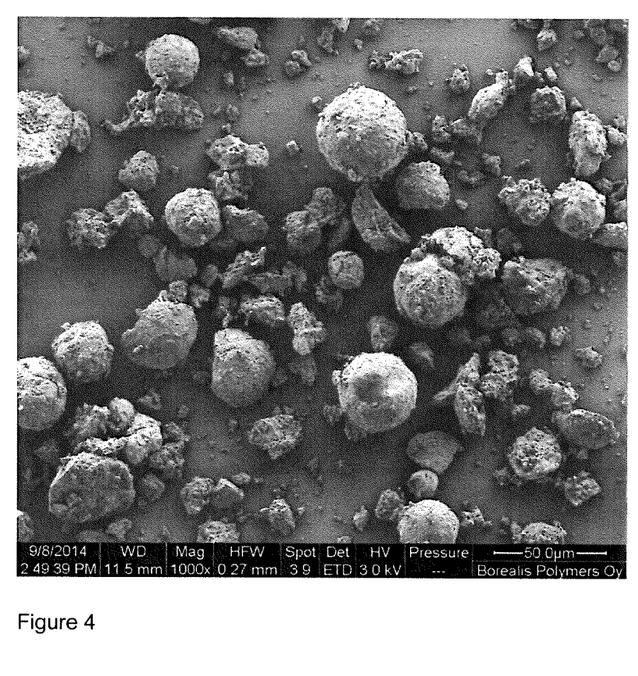
FIG. 4: SEM Figure of catalyst of comparative example 2
Figure 5:
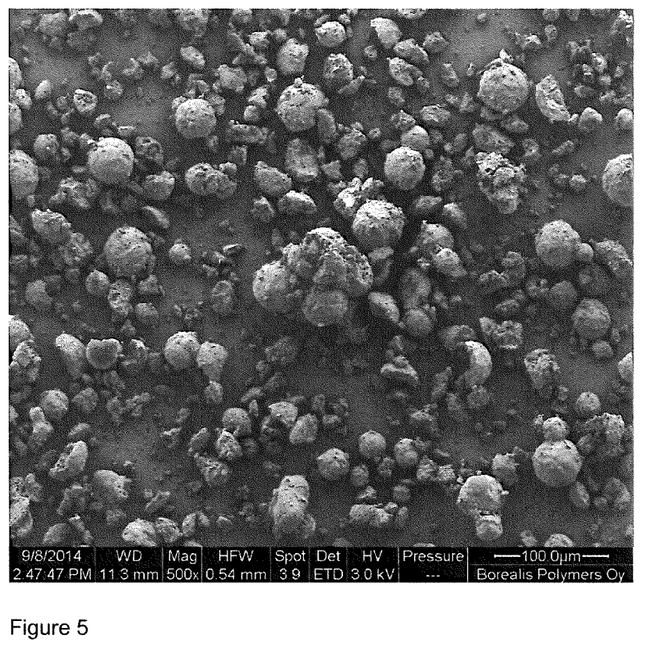
FIG. 5: SEM Figure of catalyst of comparative example 4
Figure 6:
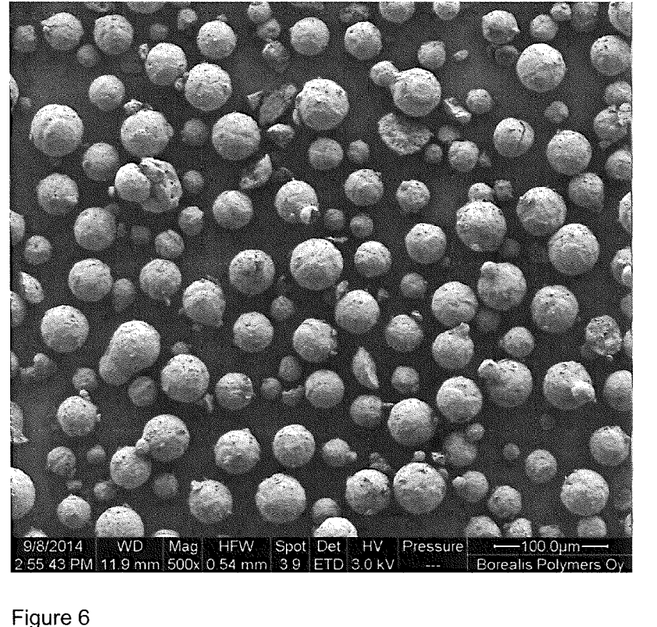
FIG. 6: SEM Figure of catalyst of inventive example 1
Figure 7:
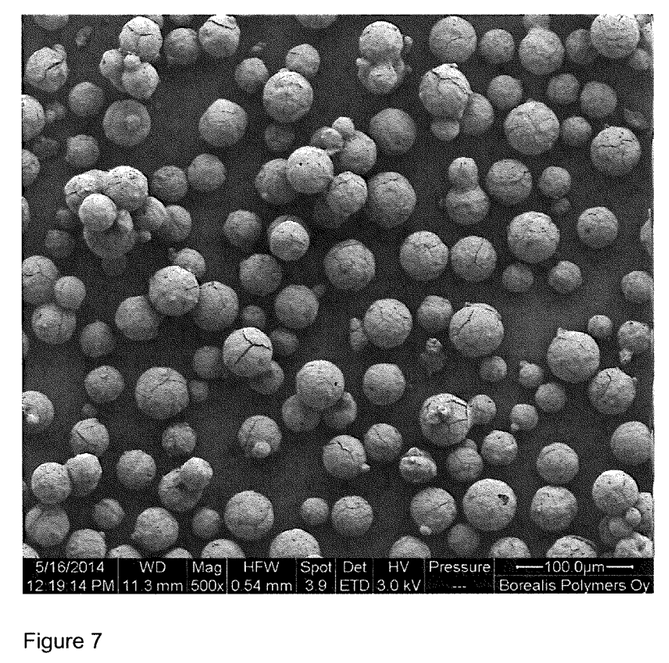
FIG. 7: SEM Figure of catalyst of inventive example 2
Figure 8:
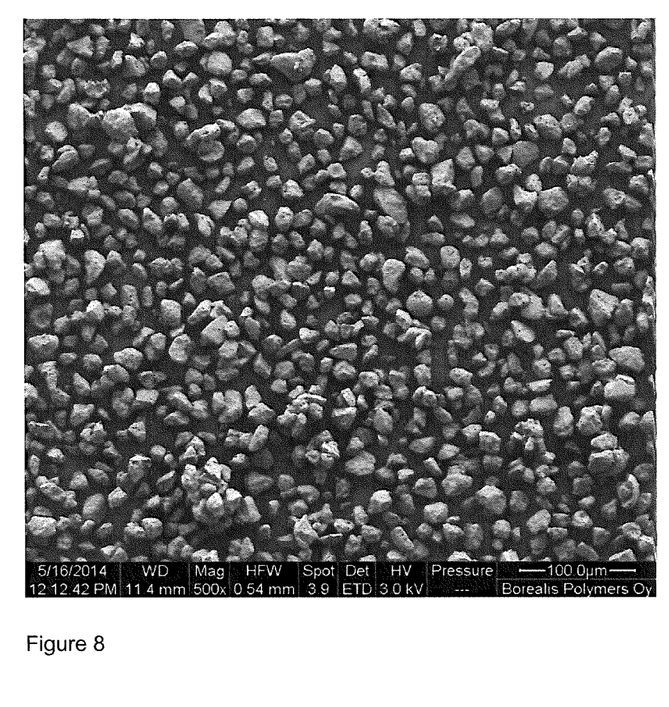
FIG. 8: SEM Figure of catalyst of inventive example 3
Figure 9:
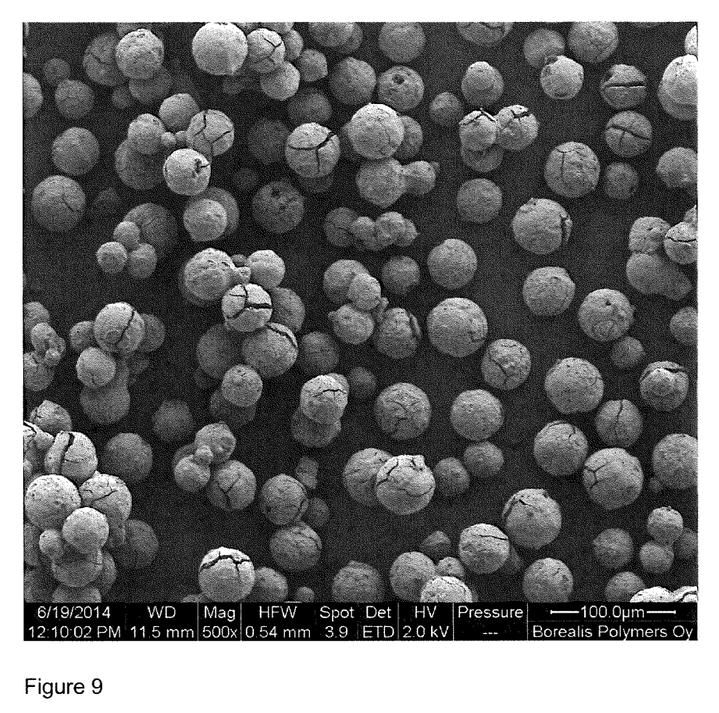
FIG. 9: SEM Figure of catalyst of inventive example 4

$^1$H-NMR of DTHFP: a 2:1 mol/mol mixture of rac-DTHFP (D,L-(rac)-DTHFP/meso-DTHFP is disclosed in FIG. 2.

Enrichment was surprisingly successful via complexation with $MgCl_2$. This enrichment step forms an additional inventive step in the present invention.

According to the method of the present invention it is an essential feature that the internal organic compound, as defined above, is added to the catalyst mixture before, during or after the pre-treating of the $MgCl_2$-mROH with the Group 13 metal compound, but before treating it with the compound of a transition metal of Group 4 to 6.

The molar ratio of the internal organic compound of formula (I)/the adduct $MgCl_2$*mROH added to the catalyst mixture is in the range of 0.02 to 0.20 mol/mol, preferably 0.05 to 0.15 mol/mol.

Thus, according to the first embodiment of the invention the solid catalyst component is prepared by
i) providing solid $MgCl_2$*mROH carrier, wherein m is 1 to 4 and R is a linear or branched alkyl group containing 1 to 8 C atoms
ii) pre-treating the solid carrier particles of step i) with an Al compound
iii) adding the internal organic compound of formula (I) into the pre-treated solid carrier of step ii) or
iii') simultaneously with step ii) adding the internal organic compound of formula (I) into the solid carrier
iv) treating the pre-treated solid carried particles of step iii) or iii') with $TiCl_4$ and
v) recovering the solid catalyst component Thus, according to the second embodiment of the invention the solid catalyst component is prepared by
i) providing solid $MgCl_2$*mROH carrier, wherein m is 1 to 4 and R is a linear or branched alkyl group containing 1 to 8 C atoms
ii-1) adding the internal organic compound of formula (I) into the solid carrier of step i)
iii-1) pre-treating the solid carrier particles of step ii-1) with an Al compound
iv-1) treating the pre-treated solid carried particles of step iii-1) with $TiCl_4$ and
v-1) recovering the solid catalyst component.

According to the embodiments above the Al compound can be added to the solid carrier before or after adding the internal organic compound or simultaneously with the internal organic compound to the carrier.

Most preferably in the first and second embodiments, m is 2.7 to 3.3, ROH is ethanol, aluminum compound is an aluminium trialkyl compound, such as triethyl aluminium, and as internal donor is used 2,2-di(2-tetrahydrofuryl)propane, or 2,2-di-(2-furan)-propane, especially 2,2-di(2-tetrahydrofuryl)propane or isomers or mixtures thereof.

According to the catalyst preparation method of the present invention the pre-treatment with the Group 13 metal compound, preferably an aluminum compound, can be done by adding a solution of said aluminum compound in inert organic solvent, preferably in inert aliphatic hydrocarbon solvent, for example in heptane. The method of the invention allows use of a concentrated aluminum compound solution. In the case where triethylaluminiun (TEA) is used, a 15 to 100 wt-% solution of TEA in an inert hydrocarbon, preferably a 25 to 100 wt-% solution of TEA in inert aliphatic hydrocarbon solvent, like in heptane can be used, or neat TEA. It was found that by using these more concentrated solutions, the morphology remains advantageous and a reduction in waste products are realized.

The final solid catalyst component shall have Mg/Ti mol/mol ratio of 1 to 10, preferably 2 to 8, especially 3 to 7, Al/Ti mol/mol ratio 0.01 to 1, preferably 0.1 to 0.5 and Cl/Ti mol/mol ratio of 5 to 20, preferably 10 to 17.

Mg component of the final catalyst preferably originates only from the solid $MgCl_2$*mROH carrier, i.e. no additional Mg compounds are used in catalyst preparation.

Particles of the solid catalyst component of the invention are uniform in particle size without fines or agglomerates.

It is a further benefit of the invention that the molecular weight distribution (MWD) of the polymer can be narrowed by using the catalyst of the invention or prepared by the inventive method.

Further, the increase in molecular weight is not made at the expense of the productivity of the catalyst. The productivity remains at an acceptably high level or is even increased compared to use of a catalyst component of similar type but using a different internal organic compound and/or prepared by adding the internal organic compound during or after the treatment step with $TiCl_4$, or using said organic compound as external additive, or using said organic compound in precipitated $MgCl_2$ based catalysts. Thus, the performance of the catalyst prepared by the method of the present invention makes it possible to broaden the preparation window of the polyethylene such that polymerisation with both higher and lower amounts of hydrogen is possible while retaining good productivity.

Especially an optimal combination of molar mass variability, MWD, comonomer response, comonomer composition distribution (CCD) and activity and productivity makes the present catalyst very attractive for producing polyethylene.

The catalyst of the invention comprises, in addition to the solid catalyst component as defined above, a cocatalyst, which is also known as an activator. Cocatalysts are organometallic compounds of Group 13 metal, typically aluminum compounds. These compounds include alkyl aluminium halides, preferably alkyl aluminium chlorides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Also other aluminium alkyl compounds, such as isoprenylaluminium, may be used. Especially preferred cocatalysts are trialkylaluminiums, of which triethylaluminium, trimethylaluminium and tri-isobutylaluminium are particularly used.

The catalyst of the invention may also comprise an external additive, like external donor. External additives that can be used include ether compounds, typically tetrahydrofuran, siloxane or silane type of external donors and/or alkyl halides as is known from prior art.

The catalyst of the present invention can be used for polymerising ethylene optionally with one or more comonomers. Commonly used comonomers are alpha-olefin comonomers preferably selected from $C_3$-$C_{20}$-alpha-olefins, more preferably are selected from $C_4$-$C_{10}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4- hexadiene, or cyclic olefins, such as norbornene, and any mixtures thereof. Most preferably, the comonomer is 1-butene and/or 1-hexene.

The catalyst of the present invention allows for the production of a wide range of polyethylene polymers. Thus, production of high density, medium density and low density ethylene polymers is possible.

Catalyst of the present invention can be used in any commonly used uni- and multimodal processes for producing polyethylene. Typically polyethylene polymers are produced in a multimodal process configuration. The multimodal ethylene copolymer may be produced in any suitable polymerization process known in the art comprising at least two polymerization stages. It is preferred to operate the polymerization stages in cascaded mode. The polymerizations may be operated in slurry, solution, or gas phase conditions or their combinations. Suitable processes comprising cascaded slurry and gas phase polymerization stages are disclosed, among others, in WO-A-92/12182 and WO-A-96/18662.

In a multimodal polymerisation configuration, the polymerisation stages comprise polymerisation reactors selected from slurry and gas phase reactors. In one preferred embodiment, the multimodal polymerisation configuration comprises at least one slurry reactor, in some embodiment two slurry reactors followed by at least one gas phase reactor, preferably one gas phase reactor.

The catalyst may be transferred into the polymerization process by any means known in the art. It is thus possible to suspend the catalyst in a diluent and maintain it as homogeneous slurry. Especially preferred is to use oil having a viscosity from 20 to 1500 mPa·s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in slurry usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art. Furthermore, one or more alpha-olefin comonomers may be added into the reactor to control the density and morphology of the polymer product. The actual amount of such hydrogen and comonomer feeds depends on the desired melt index (or molecular weight) and density (or comonomer content) of the resulting polymer.

The polymerization in gas phase may be conducted in a fluidized bed reactor, in a fast fluidized bed reactor or in a settled bed reactor or in any combination of these.

Typically the fluidized bed or settled bed polymerization reactor is operated at a temperature within the range of from 50 to 100° C., preferably from 65 to 90° C. The pressure is suitably from 10 to 40 bar, preferably from 15 to 30 bar.

Also antistatic agent(s) may be introduced into the slurry and/or gas phase reactor if needed. The process may further comprise pre- and post-reactors.

The polymerization steps may be preceded by a pre-polymerisation step. The pre-polymerisation step may be conducted in slurry or in gas phase. Preferably pre-polymerisation is conducted in slurry, and especially in a loop reactor. The temperature in the pre-polymerisation step is typically from 0 to 90° C., preferably from 20 to 80° C. and more preferably from 30 to 70° C.

The pressure is not critical and is typically from 1 to 150 bar, preferably from 10 to 100 bar.

The polymerisation may be carried out continuously or batch wise, preferably the polymerisation is carried out continuously.

A preferred multistage process for producing ethylene (co)polymers according to the invention comprises a slurry phase polymerisation stage and a gas phase polymerisation stage. Each stage can comprise one or more polymerisation reactors. One suitable reactor configuration comprises one to two slurry reactors, preferably loop reactors and one gas phase reactor. Such polymerisation configuration is described e.g. in patent literature, such as in WO-A-92/12182 and WO-A-96/18662 of Borealis and known as Borstar technology.

EXPERIMENTAL PART

Methods
Melt Flow Rate
  MFR$_2$: 190° C., 2.16 kg load
  MFR$_5$: 190° C., 5 kg load The melt flow rate is measured in accordance with ISO 1133 and is indicated in g/10 min. The MFR is an indication of the flowability, and hence the processability, of the polymer. The higher the melt flow rate, the lower the viscosity of the polymer.

Molecular weight averages, molecular weight distribution (Mn, Mw, Mz, MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol toll 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\eta_{PS}=0.655$ $K_{PE}=39\times10^{-3}$ mL/g, $\eta_{PE}=0.725$ $K_{PP}=19\times10^{-3}$ mL/g, $\eta_{PP}=0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Melt Temperature

Melt temperature is measured by Differential Scanning Calorimeter (DSC) according to ISO 11357 using Mettler TA820 Differential Scanning Calorimeter (DSC) on 3±0.5 mg samples.

ICP Analysis (Al, Mg, Ti)

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma—Optical Emmision Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% $HNO_3$ in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Comonomer Content from PE (FTIR)

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 $cm^{-1}$. The comonomer used in the calibration samples was the same as the comonomer present in the samples. The analysis was performed by using the resolution of 2 $cm^{-1}$, wave number span of from 4000 to 400 $cm^{-1}$ and the number of sweeps of 128. At least two spectra were run from each film.

The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where $C_i$ is the comonomer content of the calibration sample i $A_{1378,i}$ is the absorbance at appr. 1378 cm$^{-1}$ of sample i $s_i$ is the thickness of the film made of calibration sample i k is the slope of the calibration line (obtained by regression analysis), and b is the intercept of the calibration line (obtained by regression analysis).

By using the thus obtained parameters k and b the comonomer content of the samples were obtained from $$C_x = k \cdot \frac{A_{1378,x}}{s_x} + b$$

where $C_x$ is the comonomer content of the unknown sample $A_{1378,x}$ is the absorbance at appr. 1378 cm$^{-1}$ of the unknown sample $s_x$ is the thickness of the film made of the unknown sample k is the slope of the calibration line obtained from the calibration samples as above b is the intercept of the calibration line obtained from the calibration samples.

The method gives the comonomer content in weight-% or in mol-%, depending on which was used in the calibration. If properly calibrated, the same approach may also be used to determine the number of methyl groups, i.e., CH$_3$ per 1000 carbon atoms.

EXAMPLES

Raw Materials

The standard 10 and 25 wt % TEA (triethyl aluminium) solutions in heptane were prepared by dilution of 100% TEA-S from Chemtura.

MgCl$_2$*3EtOH carriers were received from GRACE (Table 1).

2,2-Di(2-tetrahydrofuryl)propane (DTHFP) was supplied by TCI EUROPE N.V. as a mixture (1:1) of diastereomers (D,L-(rac)-DTHFP and meso-DTHFP.

TiCl$_4$ was supplied by Aldrich (Metallic impurities<1000 ppm, Metals analysis>99.9%).

TABLE 1

| MgCl$_2$*3EtOH carriers. | | |
|---|---|---|
| Carrier | Granular 20 μm | Spherical 45 μm |
| Mg (wt %) | 9.86 | 9.87 |
| Ethanol (wt %) | 59.7 | 59.0 |
| EtOH/Mg (mol/mol) | 3.20 | 3.16 |
| D10 (μm) | 12.1 | 32.1 |
| D50 (μm) | 21.1 | 45.3 |
| D90 (μm) | 31.8 | 63.8 |

In the following examples preparation of the comparative and inventive catalysts as well use of the catalysts in the polymerisations are disclosed. Catalysts and polymer properties are disclosed in Table 2. SEM figures of Catalyst are disclosed in FIGS. 3-9

Comparative Example 1 (CE1)

The catalyst was prepared following the preparation procedure described in EP0376936.

A. Pre-Treated Support Material Preparation:

In an inert atmosphere glove box (<1 ppm O$_2$, H$_2$O): A dry 250 mL, 4-neck round-bottom flask equipped with two rubber septa, a thermometer, and mechanical stirrer was charged with 30 mL of heptane and 5 g (20 mmol of Mg) of spherical 45 μm MgCl$_2$*3EtOH carrier. The flask was removed from the glove-box, a nitrogen inlet and outlet were fixed. The flask was placed in a cooling bath and stirred for approximately 10 min at 250 rpm. A precooled 10 wt % solution of triethylaluminum (81.8 g, 72 mmol of Al; Al/EtOH=1.1 mol/mol) in heptane was added dropwise during 1 h time, keeping the temperature below 0° C., due to the liberation of C$_2$H$_6$. The obtained suspension was heated to 80° C. in 20 min and kept at this temperature for 30 min at 250 rpm. The suspension was allowed to settle for 5 min at 80° C., and the supernatant was removed by cannula. The obtained pre-treated support material was washed with stirring once with 50 mL of toluene at 80° C. and twice with 50 mL of toluene at 50° C. (addition of toluene, stirring at 250 rpm for 15 min, settling for 5 min, removal of liquid by cannula).

B. Catalyst Preparation:

At room temperature, 100 mL of toluene was added to the pre-treated support material of step A. The mixture was stirred for approximately 30 min at 250 rpm. Neat TiCl$_4$ (3.984 g, 21.0 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed by cannula. The obtained catalyst was washed with 50 mL of toluene at 90° C., with 50 mL of toluene at 50° C. and with 50 mL of pentane at room temperature (addition of preheated toluene or pentane, stirring at 250 rpm for 15 min, settling for 5 min, removing of the supernatant liquid by cannula). The catalyst was dried with nitrogen flow at 60° C. for 1.5 h. The yield was 2 g (70% based on Mg).

C. Bench-Scale Copolymerization with 1-Butene

The catalyst (8.5 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the following procedure:

An empty 3 L bench-scale reactor was charged with 55 mL of 1-butene at 20° C. and stirred at 200 rpm. Then 1250 mL of propane was added to the reactor as a polymerization medium, followed by the addition of hydrogen gas (0.75 bar). The reactor was heated to 85° C., and ethylene (3.7 bar) was added batchwise. The reactor pressure was kept at 0.2 bar of overpressure and stirring speed was increased to 550 rpm. The catalyst and the co-catalyst were added together (a few seconds of pre-contact between catalyst and TEA) to the reactor with additional 100 mL of propane. The total reactor pressure was maintained at 38.3 bar by continuous ethylene feed. The polymerization was stopped after 60 min by venting off the monomers and H$_2$. The obtained polymer was left to dry in a fume hood overnight before weighing.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Comparative Example 2 (CE2)

The catalyst was prepared with 25 wt % TEA and with a lower volume of solvent used.

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 30 mL of heptane and 5.1 g (21 mmol of Mg) of spherical 45 μm $MgCl_2$*3EtOH carrier. The flask was removed from the glove-box, a nitrogen inlet and outlet were fixed. The flask was placed in a cooling bath and stirred for approximately 10 min at 250 rpm. A precooled 25 wt % solution of triethylaluminum (30.4 g, 67 mmol of Al; Al/EtOH=1.0 mol/mol) in heptane was added dropwise during 1 h time, keeping the temperature below 0° C. due to the liberation of $C_2H_6$. The obtained suspension was heated to 80° C. in 20 min and kept at this temperature for 30 min at 250 rpm. The suspension was settled for 5 min at 80° C., and the supernatant removed via cannula. The obtained pre-treated support material was washed twice with 50 mL of toluene at room temperature (addition of toluene, stirring at 250 rpm for 15 min, settling for 5 min, solvent removal via cannula).

B. Catalyst Preparation:

At room temperature, 50 mL of toluene was added to the pre-treated support material of step A. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed by cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of the liquid by cannula). The catalyst was dried with nitrogen flow at 50° C. for 1.5 h. The yield was 2.7 g or 76% based on Mg.

C. Bench-Scale Copolymerization with 1-Butene

The catalyst (6.2 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the procedure described in Comparative Example 1C.

D. Polymerization Results

The results of the polymerization reaction are shown in Table 1. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Comparative Example 3 (CE3)

C. The catalyst from Comparative Example 2 (6.2 mg) was tested in copolymerization with 1-butene with DTHFP as an external additive (DTHFP/Mg=0.14 mol/mol, DTHFP/Ti=0.47 mol/mol). Triethylaluminum (TEA) was used as a co-catalyst with an Al/Ti molar ratio of 15. DTHFP was premixed with TEA solution in glove-box 1 h before the polymerization. The polymerization reaction was carried out in a 3 L bench-scale reactor in accordance with the procedure described in Comparative Example 1C.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Comparative Example 4 (CE4)

C. The catalyst from Comparative Example 2 (7.2 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the following procedure:

An empty 3 L bench-scale reactor was charged with 70 mL of 1-butene at 20° C. and stirred at 200 rpm. Then, propane (1250 mL) was added to the reactor as a polymerization medium, followed by the addition of hydrogen gas (0.40 bar). The reactor was heated to 85° C., and a batch of ethylene (3.7 bar) was added. The reactor pressure was kept at 0.2 bar of overpressure and stirring speed was increased to 550 rpm. The catalyst and the co-catalyst were added together (a few seconds of precontact between catalyst and TEA) to the reactor with additional 100 mL of propane. The total reactor pressure was maintained at 37.5 bar by continuous ethylene feed. The polymerization was stopped after 60 min by venting off the monomers and $H_2$. The obtained polymer was left to dry in a fume hood overnight before weighing.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Inventive Example 1 (IE1)

DTHFP as an internal organic compound was added just before the addition of $TiCl_4$.

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 30 mL of heptane and 5 g (20 mmol of Mg) of spherical 45 μm $MgCl_2$*3EtOH carrier. The flask was removed from the glove-box, a nitrogen inlet and outlet were fixed. The flask was placed in a cooling bath and stirred for approximately 10 min at 250 rpm. A precooled 25 wt % solution of triethylaluminum (30.4 g, 67 mmol of Al; Al/EtOH=1.1 mol/mol) in heptane was added dropwise during 1 h time, keeping the temperature below 0° C. The obtained suspension was heated to 80° C. in 20 min and kept at this temperature for 30 min at 250 rpm. The suspension was settled for 5 min at 80° C., and the liquid was removed by cannula. The obtained pre-treated support material was washed twice with 50 mL of toluene at room temperature (addition of toluene, stirring at 250 rpm for 15 min, settling for 5 min, removal of the liquid by cannula).

B. Catalyst Preparation:

At room temperature, DTHFP (0.38 g, DTHFP/Mg=0.1 mol/mol) dissolved in 50 mL of toluene was added to the pre-treated support material. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed by cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of the liquid by cannula). The catalyst was dried with nitrogen flow at 50° C. for 1.5 h. The yield was 3.3 g or 89% based on Mg.

C. Bench-Scale Copolymerization with 1-Butene

The catalyst (6.0 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the procedure described in Comparative Example 4C.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Inventive Example 2 (IE2)

DTHFP as an internal organic compound was added just before the addition of TEA. The catalyst is based on 45 μm $MgCl_2$*3EtOH carrier.

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 0.38 g of DTHFP (DTHFP/Mg=0.1 mol/mol) dissolved in 30 mL of heptane and 5.1 g (21 mmol of Mg) of spherical 45 μm $MgCl_2$*3EtOH carrier. The flask was removed from the glove-box, a nitrogen inlet and outlet were fixed. The flask was placed in a cooling bath and stirred for approximately 10 min at 250 rpm. A precooled 25 wt % solution of triethylaluminum (30.4 g, 67 mmol of Al; Al/EtOH=1.0 mol/mol) in heptane was added dropwise during 1 h time, keeping the temperature below 0° C. The obtained suspension was heated to 80° C. in 20 min and kept at this temperature for 30 min at 250 rpm. The suspension was settled for 5 min at 80° C., and the liquid was removed by cannula. The obtained pre-treated support material was washed twice with 50 mL of toluene at room temperature (addition of toluene, stirring at 250 rpm for 15-120 min, settling for 5 min, removal of liquid via cannula).

B. Catalyst Preparation:

At room temperature, 50 mL of toluene was added to the pre-treated support material. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed via cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of liquid by cannula). The catalyst was dried with nitrogen flow at 50° C. for 1.5 h. The yield was 3.6 g (100% based on Mg.

C. Bench-Scale Copolymerization with 1-Butene

The catalyst (5.7 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the procedure described in Comparative Example 4C.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Inventive Example 3 (IE3)

DTHFP as an internal organic compound was added just before the addition of TEA. The catalyst is based on 20 μm $MgCl_2$*3EtOH carrier.

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 0.38 g of DTHFP (DTHFP/Mg=0.1 mol/mol) dissolved in 30 mL of heptane and 5 g (20 mmol of Mg) of granular 20 μm $MgCl_2$*3EtOH carrier. The flask was removed from the glove-box, a nitrogen inlet and outlet were fixed. The flask was placed in a cooling bath and stirred for approximately 10 min at 250 rpm. A precooled 25 wt % solution of triethylaluminum (30.4 g, 67 mmol of Al; Al/EtOH=1.0 mol/mol) in heptane was added dropwise during 1 h time, keeping the temperature below 0° C. The obtained suspension was heated to 80° C. in 20 min and kept at this temperature for 30 min at 250 rpm. The suspension was settled for 5 min at 80° C., and the liquid was removed via cannula. The obtained pre-treated support material was washed twice with 50 mL of toluene at room temperature (addition of toluene, stirring at 250 rpm for 15-120 min, settling for 5 min, removal of liquid by cannula).

B. Catalyst Preparation:

At room temperature, 50 mL of toluene was added to the pre-treated support material. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed-via cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of liquid via cannula). The catalyst was dried with nitrogen flow at 50° C. for 1.5 h. The yield was 3.4 g (94% based on Mg).

C. Bench-Scale Copolymerization with 1-Butene

The catalyst (7.0 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the procedure described in Comparative Example 4C.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

Inventive Example 4 (IE4)

Enriched rac-DTHFP (D,L-(rac)-DTHFP/meso-DTHFP=2/1 mol/mol) as an internal organic compound was added just before the addition of TEA. The catalyst is based on 45 μm $MgCl_2*3EtOH$ carrier.

Anhydrous $MgCl_2$ (0.95 g, 10 mmol) was mixed with 3.68 g of DTHFP (20 mmol; D,L-(rac)-DTHFP/meso-DTHFP=1/1 mol/mol) at room temperature. The obtained suspension was heated to 130° C. and stirred for 3 h. The mixture was cooled to room temperature and filtered. The obtained filtrate contained a mixture of D,L-(rac)-DTHFP and meso-DTHFP (2/1 mol/mol; yield 93%) and was used as it is for catalyst synthesis.

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 0.38 g of enriched rac-DTHFP (DTHFP/Mg=0.1 mol/mol) dissolved in 30 mL of heptane and 5.1 g (21 mmol of Mg) of spherical 45 μm $MgCl_2*3EtOH$ carrier. The flask was removed from the glove-box, a nitrogen inlet and outlet were fixed. The flask was placed in a cooling bath and stirred for approximately 10 min at 250 rpm. A pre-cooled 25 wt % solution of triethylaluminum (30.4 g, 67 mmol of Al; Al/EtOH=1.0 mol/mol) in heptane was added dropwise during 1 h time, keeping the temperature below 0° C. The obtained suspension was heated to 80° C. in 20 min and kept at this temperature for 30 min at 250 rpm. The suspension was settled for 5 min at 80° C., and the liquid was removed by cannula. The obtained pre-treated support material was washed twice with 50 mL of toluene at room temperature (addition of toluene, stirring at 250 rpm for 15-120 min, settling for 5 min, removal of the liquid by cannula).

B. Catalyst Preparation:

At room temperature, 50 mL of toluene was added to the pre-treated support material. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed by cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of liquid via cannula). The catalyst was dried with nitrogen flow at 50° C. for 1.5 h. The yield was 3.8 g (100% based on Mg).

C. Bench-Scale Copolymerization with 1-Butene

The catalyst (7.2 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the procedure described in Comparative Example 4C.

D. Polymerization Results

The results of the polymerization reaction are shown in Table 2. The activity of the catalyst was calculated on the basis of the amount of polymer produced. Molecular weight and molecular weight distribution were measured by gel permeation chromatography (GPC). The butene-co-monomer content was measured by IR. The melting temperature of copolymer was measured by DSC.

TABLE 2

Catalyst and polymerisation results

| Example | CE1 | CE2 | CE3 | CE4 | IE1 | IE2 | IE3 | IE4 |
|---|---|---|---|---|---|---|---|---|
| Catalyst | | | | | | | | |
| Mg (wt %) | 17.4 | 13.9 | 13.9 | 13.9 | 13.3 | 13.7 | 13.6 | 13.0 |
| Al (wt %) | 0.5 | 0.5 | 0.5 | 0.50 | 0.72 | 0.84 | 0.70 | 0.99 |
| Ti (wt %) | 4.02 | 8.24 | 8.24 | 8.24 | 5.11 | 4.36 | 4.19 | 6.19 |
| Cl (wt %) | — | 57.1 | 57.1 | 57.1 | 49.5 | 49.8 | 48.8 | 48.2 |
| Mg/Ti (mol/mol) | 8.5 | 3.3 | 3.3 | 3.3 | 5.1 | 6.2 | 6.4 | 4.1 |
| Al/Ti (mol/mol) | 0.2 | 0.1 | 0.1 | 0.1 | 0.3 | 0.3 | 0.3 | 0.3 |
| Cl/Ti (mol/mol) | nd | 9.4 | 9.4 | 9.4 | 13.1 | 15.4 | 15.7 | 10.5 |
| Morphology | No broken particles | Broken particles | nd | Broken particles | No broken particles | No broken particles | No broken particles | No broken particles |
| Polymerisation | * | * | * | ** | ** | ** | ** | ** |
| Activity | 28.7 | 24.5 | 9.2 | 28.0 | 17.2 | 22.3 | 33.1 | 22.9 |
| Polymer | | | | | | | | |
| Mw | 123000 | 123000 | 121500 | 172000 | 261000 | 225000 | 213000 | 172000 |
| MWD | 7.2 | 7.3 | 10.2 | 7.9 | 3.8 | 3.6 | 3.7 | 4.2 |
| $C_4$ content | 7.1 | 6.8 | 10.3 | 6.5 | 4.8 | 5.8 | 5.0 | 5.6 |
| Mp (° C.) | 123.9 | 123.6 | 123.3 | 121.7 | 121.6 | 121.2 | 121.0 | 121.5 |

* Under test copolymerization conditions: T = 85° C., $C_2$ = 5 mol %, $H_2/C_2$ = 40 mol/kmol, $C_4/C_2$ = 770 mol/kmol, t = 1 h, Al/Ti = 15 mol/mol.
** Under test copolymerization conditions: T = 85° C., $C_2$ = 5 mol %, $H_2/C_2$ = 20 mol/kmol, $C_4/C_2$ = 970 mol/kmol, t = 1 h, Al/Ti = 15 mol/mol
nd—not defined As can be seen from the results, the molecular weight of polymers produced by the inventive method is higher or at least on the same level as that in comparative examples and still the activity remains at a good level. At the same time, the MWD is narrower, the comonomer content is lower and the melting temperature is lower than in comparative examples. The morphology of the catalysts of the inventive examples is also uniform. In example CE4, the activity and Mw are on a good level, however, other properties (MWD, C4 content and Mp) are disadvantageously higher than in the inventive examples. Furthermore, the morphology of the catalyst is not at all satisfactory indicating possible difficulties in large scale production.

The invention claimed is:

1. A method for producing solid $MgCl_2$ supported catalyst component comprising the steps
   a) providing solid carrier particles of $MgCl_2*mROH$ adduct;
   b) pre-treating the solid carrier particles of step a) with a compound of Group 13 metal;
   c) treating the pre-treated solid carried particles of step b) with a transition metal compound of Group 4 to 6;
   d) recovering the solid catalyst component;
   wherein the solid carrier particles are contacted with an internal organic compound of formula (I) or isomers or mixtures therefrom before treating the solid carrier particles in step c)

(I)

wherein in the formula (I)
$R_1$ to $R_5$ are the same or different and are hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2*mROH$ is a linear or branched alkyl group with 1 to 12 C atoms, and m is 0 to 6; and wherein the solid catalyst component has Mg/Ti mol/mol ratio of 1 to 10, Al/Ti mol/mol ratio of 0.01 to 1, and Cl/Ti mol/mol ratio of 5 to 20.

2. A method according to claim 1, wherein the solid carrier particles are contacted with the internal organic compound of formula (I) or isomers or mixtures therefrom before the pre-treating step b).

3. A method according to claim 1, wherein the solid carrier particles are contacted with the internal organic compound of formula (I) or isomers or mixtures therefrom simultaneously with the pre-treating step b) or after the pre-treating step b) but before the treating step c).

4. A method according to claim 1 wherein in the formula (I) of the internal organic compound the two $R_1$ are the same and are a linear $C_1$ to $C_4$-alkyl groups, or the two $R_1$ form with the carbon atom they are attached to a ring with 3 to 7C-atoms, $R_2$ to $R_5$ are the same or different, or two or more of $R_2$ to $R_5$ residues can form a ring.

5. A method according to claim 1 wherein in the formula (I) of the internal organic compound both $R_1$ are the same and are methyl or ethyl groups and the residues $R_2$ to $R_5$ are the same or different and are H or a $C_1$ to $C_2$-alkyl groups.

6. A method according to claim 1 wherein the internal organic compound is 2,2-di(2-tetrahydrofuryl) propane or 2,2-di-(2-furan)-propane.

7. A method according to claim 1 wherein the R in $MgCl_2*mROH$ adduct is a linear or branched alkyl group containing 1 to 8 C atoms and m is 1 to 4.

8. A method according to claim 1 wherein the Group 13 metal compound is an aluminum compound of the formula $Al(alkyl)_xX_{3-x}$ (II), wherein each alkyl is independently a linear, branched or cyclic alkyl group of 1 to 12C-atoms, X is halogen and $1<x\leq3$.

9. A method according to claim 1 wherein the Group 13 metal compound is selected from the group consisting of dialkyl aluminium chlorides, trialkyl aluminium, and mixtures therefrom.

10. A method according to claim 1 wherein no Mg compounds are used in catalyst preparation other than the $MgCl_2*mROH$ adduct.

11. A solid $MgCl_2$ supported catalyst component prepared by the method of claim 1.

12. A catalyst comprising the solid $MgCl_2$ supported catalyst component of claim 11 and a cocatalyst of Group 13 metal compound.

13. A process of producing an ethylene polymer comprising polymerising ethylene in the presence of the solid $MgCl_2$ supported catalyst component of claim 11.

14. A process for producing ethylene polymer in a polymerisation process comprising polymerisation of ethylene in the presence of the Ziegler-Natta catalyst of claim 12 under polymerisation conditions in at least one polymerisation stage carried out in a solution, slurry or gas phase reactor or combinations thereof.

15. A method according to claim 4 wherein in the formula (I) of the internal organic compound, the two $R_1$ form with the carbon atom they are attached to a cyclopentyl or cyclohexyl ring.

16. A method according to claim 4 wherein in the formula (I) of the internal organic compound, $R_3$ and $R_4$ residues form a ring and/or $R_4$ and $R_5$ residues form a ring.

17. A method according to claim 5 wherein in the formula (I) of the internal organic compound at most two of the residues $R_2$ to $R_5$ are a methyl, the others are H.

18. A method according to claim 6 wherein the internal organic compound is 2,2-di(2-tetrahydrofuryl) propane.

19. A process according to claim 13 further comprising polymerising ethylene with comonomers.

20. A method according to claim 14 further comprising polymerisation of ethylene with comonomers selected from $C_3$-$C_{20}$-alpha-olefins.

* * * * *